March 25, 1924.

J. E. RYAN 1,487,977

STANCHION AND OPERATING TABLE FOR ANIMALS

Filed May 18, 1921  4 Sheets-Sheet 1

Inventor
John E. Ryan
by Irving & Hague Attys.

March 25, 1924.  1,487,977
J. E. RYAN
STANCHION AND OPERATING TABLE FOR ANIMALS
Filed May 18, 1921  4 Sheets-Sheet 2

Inventor
John E. Ryan
by Orwig & Hague Attys.

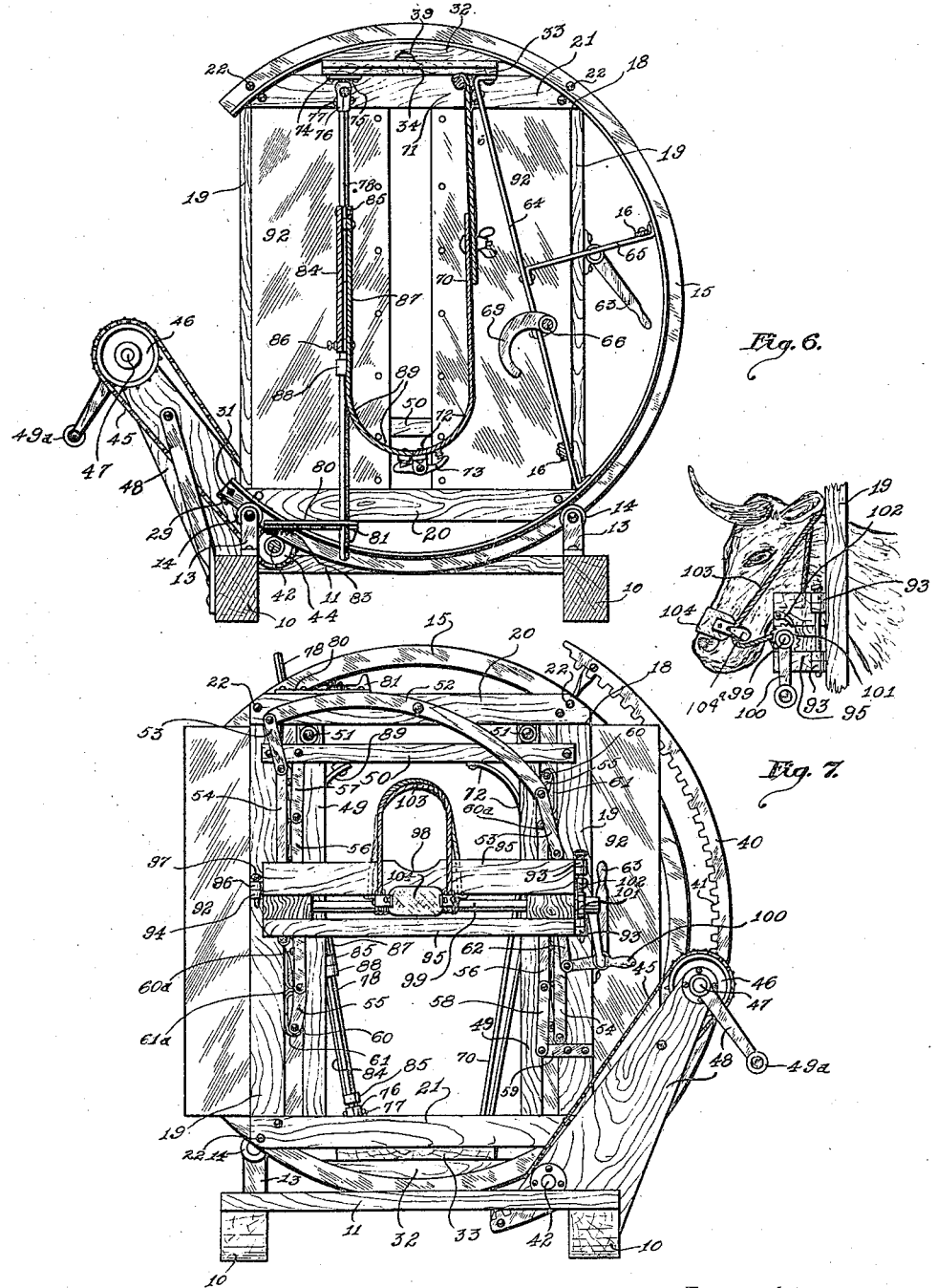

March 25, 1924.　　　　　　　　　　　　　　1,487,977
J. E. RYAN
STANCHION AND OPERATING TABLE FOR ANIMALS
Filed May 18, 1921　　　4 Sheets-Sheet 4

Inventor
John E. Ryan
by Orwig & Hague, Attys.

Patented Mar. 25, 1924.

1,487,977

UNITED STATES PATENT OFFICE.

JOHN E. RYAN, OF STUART, IOWA.

STANCHION AND OPERATING TABLE FOR ANIMALS.

Application filed May 18, 1921. Serial No. 470,741.

*To all whom it may concern:*

Be it known that I, JOHN E. RYAN, a citizen of the United States, and resident of Stuart, in the county of Guthrie and State of Iowa, have invented a certain new and useful Stanchion and Operating Table for Animals, of which the following is a specification.

This invention relates to improvements in devices which are used for the purpose of first catching and holding the animal, then moving the device to position whereby the animal may be supported by a suitable table for the purpose of performing various operations.

It is the object of my invention to provide a comparatively simple, durable and portable device which may be used to catch and hold animals, and capable of being moved to a position whereby the said animal will be placed on a suitable table and held against movement and in such a manner that the veterinarian will not become injured with the animal's movements.

A further object is to provide in a catching and holding device for animals having movable means whereby the animal may be placed on a suitable table for the purpose of performing operations on the animal, improved means whereby the said mechanism may be adjusted to various size animals, and adapted to hold the animal in a number of positions.

A further object is to provide in connection with the catching and holding device for animals, detachable means for holding the animal's head for the purpose of removing their horns.

These and other objects will be apparent to those skilled in the art.

My invention consists in the construction, arrangement and combination of the various parts of the device, whereby the objects contemplated are attained, as hereinafter more fully set forth, pointed out in my claims, and illustrated in the accompanying drawings, in which:

Figure 5 is a front end elevation showing the stanchion in an opened position, and also my improved dehorning device attached in operative position.

Figure 6 is a transverse sectional view taken on the line 6—6 of Figure 2.

Figure 7 is a detail and segmental side view of the dehorning device showing the manner in which the animal's head is placed in position thereon.

Figures 1, 2:
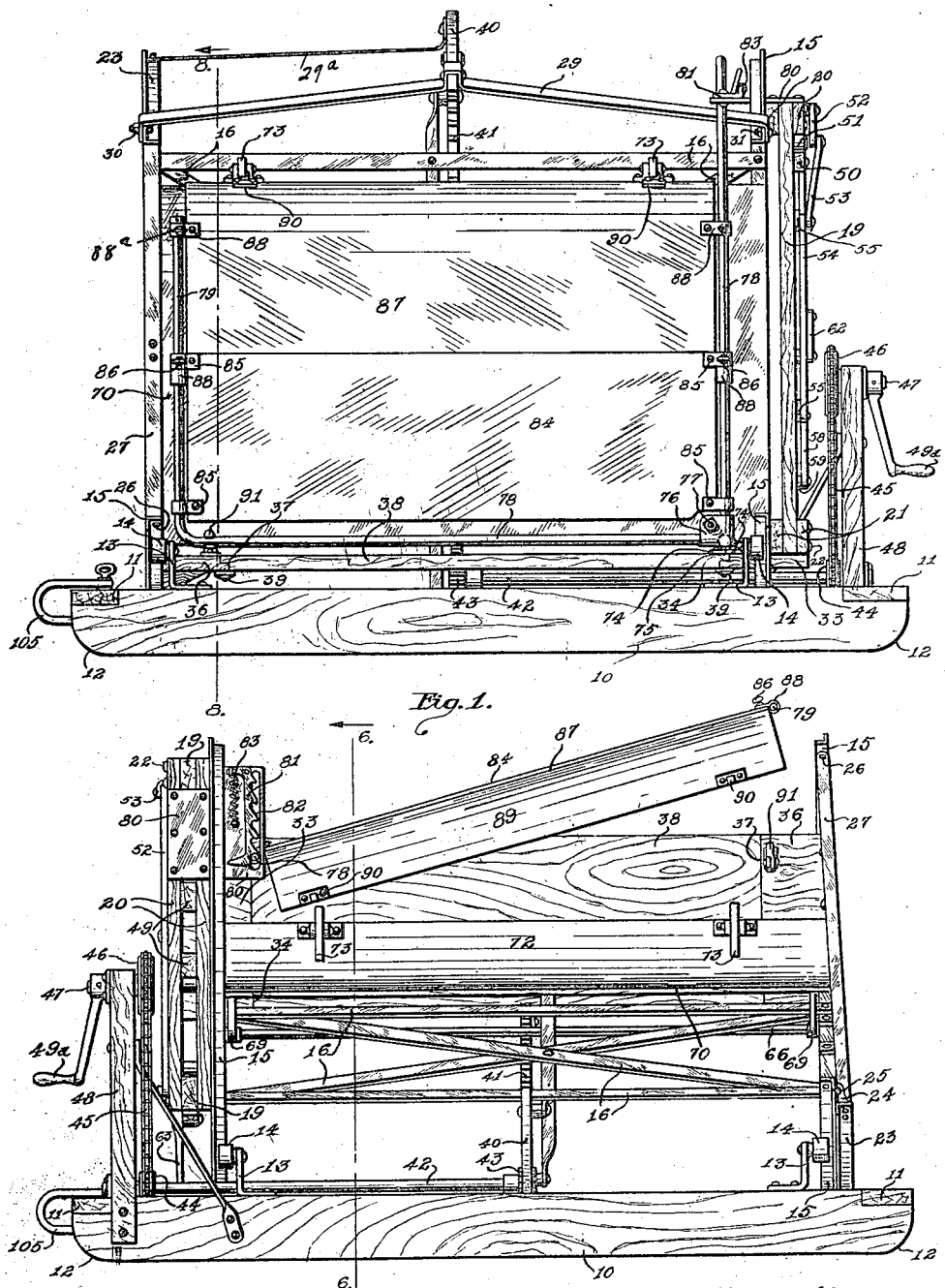
Figure 1 is a side elevation of my improved mechanism.
Figure 2 is a side elevation of the same with certain of the mechanism moved to position to adapt the device to be used as an operating table.

The numeral 10 indicates the sills which are arranged parallel with each other and secured in position relative to each other by means of cross members 11. The said sills 10 are slightly rounded at their lower end corners as indicated at 12 for the purpose of providing a sort of runner so that my device may be transported from one position to another. The sills 10 and the members 11 form a base upon which the device is mounted.

Mounted upon the top edge of each of the sills 10 I have provided a series of brackets 13, each of which is provided with a roller 14. These rollers are designed to carry the frame work of my improved mechanism which comprises circular members 15 formed preferably of angle iron, one of the members of said iron being designed to engage the rollers 14, while the downwardly extending flange holds the said irons in position on said rollers. The members 15 are secured in position relative to each other by means of cross braces 16. These members 15 are arranged transversely with the members 10.

Mounted in front of the members 15 I have provided a rectangular frame 18 which is built preferably of wood, said frame comprising members 19 parallel with each other and placed normally in a vertical position.

Secured to each side of the top ends of said members 19, I have provided a beam 20 and secured to the lower ends of the said members 19 I have provided a beam 21. The beams 20 and 21 are arranged substantially horizontal and are secured to the member 15 by means of bolts 22.

Figures 3, 4:
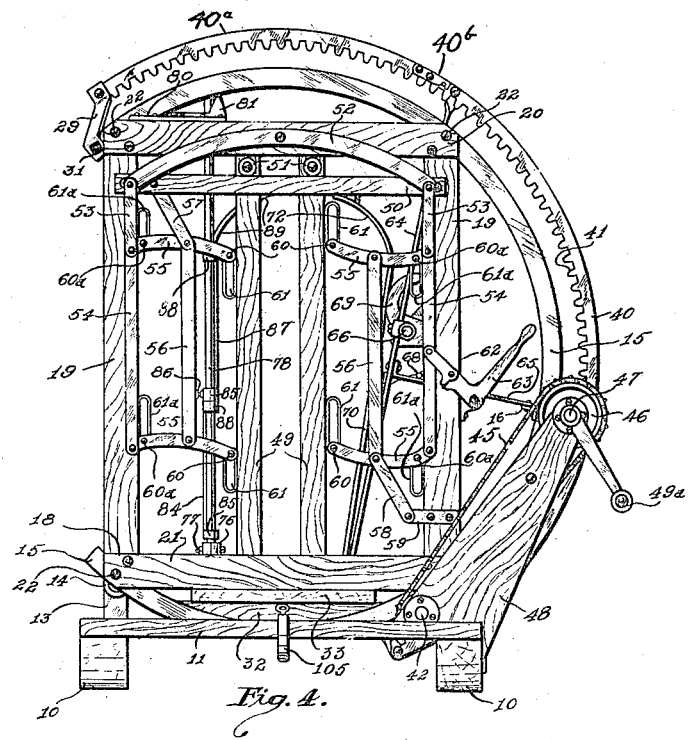
Figure 3 is a rear end elevation of Figure 2.
Figure 4 is a front end elevation of Figure 1.
Figure 8:
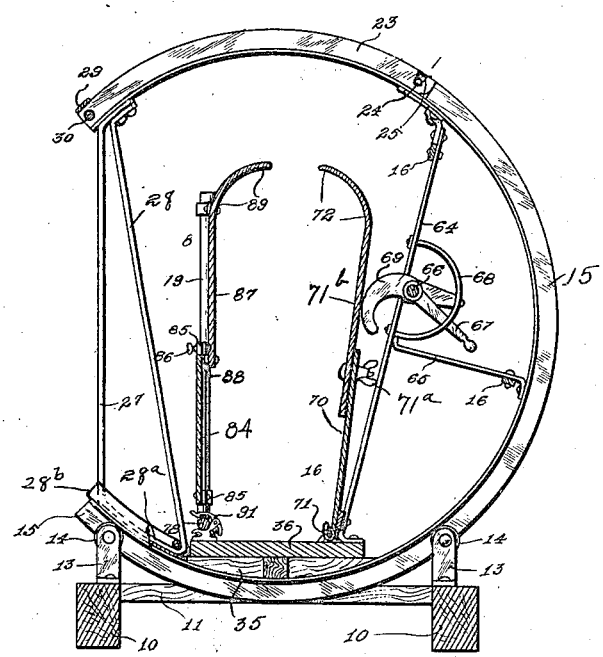
Figure 8 is a transverse sectional view taken on the line 8—8 of Figure 1.

It will be seen from Figures 3 and 6 that the front member 15 is of a length substantially equal to three-fourths of the circle. The back member 15, however, is of a length substantially equal to one-half of the circle and is provided with a member 23. This member is substantially equal to one-fourth of a circle in length and is pivotally connected to the back member 15 by means of a pin 24 secured transversely in the member 15, the said pin being designed to enter a slot 25 in the member 23. This member 23 is formed of a piece of angle similar to the member 15 and has secured at its opposite end brace members 27 and 28. These members are formed of a single piece of strap iron and so folded as to provide a curved portion 28$^a$. This curved portion is designed to enter a channel member 28$^b$ secured to the inner face of the left-hand end of the member 15, as illustrated in Figure 8.

By the construction just described, it will be seen that the curved portion 28$^a$ may be swung out of the channel 28$^b$ about the pivot 24 as a center, the curve of the member 28$^a$ being of a circle from said center. This provides means whereby the member 23 may be detached from the member 15, the purpose of which will hereinafter be made clear. When the member is in its attached position, as shown in Figure 8, it forms a continuous track upon which the mechanism may be carried on the rollers 14.

For holding the member 23 against lateral movement when it is in its working position, I have provided a brace 29 which is rigidly secured to the free end of the member 23 by means of a bolt 30, said brace extending forwardly and longitudinally with the main frame and having its forward end connected to the front member 15 by means of a bolt 31, clearly shown in Figure 1.

Secured on the upper face of the lower side of the front member 15, as shown in Figures 4 and 5, I have provided a segmental block 32. Mounted upon the block 32, I have provided a short board 33, the lower face of which engages the said block 32 and its upper face is secured to the members 21. This board extends rearwardly and is provided with a rabbet 34, as clearly shown in Figure 1.

Secured to the rear member 15, I have provided a block 35 similar to the block 32. This block is designed to carry a board 36 similar to the board 33, having a rabbet 37.

Mounted between the ends of the boards 33 and 36, I have provided a floor member 38 having a rabbet at each end to coact with the rabbets 34 and 37 so that the said floor member may be detachably mounted when so desired. The board is held in position by means of pivoted fasteners 39.

Secured to the brace members 16 near their central portion, I have provided a circular rack 40 having internal gear teeth 41. Mounted on the members 10 and 11, I have provided a shaft 42, shown in Figures 2 and 5, having on one end a pinion 43 designed to mesh with the teeth 41 of the member 40, and on its opposite end a sprocket wheel 44 designed to carry a chain 45 mounted in front of the main frame on the sprocket 46. The sprocket 46 is designed to be carried by a shaft 47 mounted in a standard 48 secured to the forward end of one of the members 10. The shaft 47 is provided with a crank 49$^a$ by which the sprocket 46 may be rotated.

By this arrangement, it will be seen that I have provided a frame which is rotatively mounted on the base and which may be rotated by operating the crank 49$^a$, which will in turn rotate the sprocket 46. This will operate the sprocket 44 through the chain 45. The pinion 43 will be rotated through the shaft 42 which will in turn rotate the rack 40 and consequently the members 15, thereby providing a frame which may be rotated at the will of the operator, for the purpose hereinafter to be made clear.

I have provided in the forward end of the rotatively mounted frame a stanchion device for catching and retaining the animal in position, which comprises vertical stanchion members 49 parallel with the members 19. These members are slidably mounted between the members 21 at their lower ends and the members 20 at their upper ends. A cross bar 50 is provided a slight distance below the front member 20 and designed to carry rollers 51 which are pivotally mounted on the upper ends of the members 49 to carry the weight of said members.

For moving the members 49 to or from each other and in parallel relation to each other, I have provided the following mechanism:

Pivotally mounted to the forward and central portion of the forward member 20, I have provided a curved lever 52, each end of which is provided with a pivoted depending link 53, as shown in Figure 4. The lower end of each of the links 53 is provided with a link 54, the upper and lower ends of each of which are provided with inwardly extending and pivotally connected bars 55, the circular portions of said bars being pivoted to a vertically arranged link 56, the upper end of the left hand link 56, as shown in Figure 1, being pivoted to a link 57, the upper end of which is pivoted to the bar 50. The lower end of the right hand link 56 is connected to a link 58, the lower end of which is pivotally connected to a bar 59 secured to the right hand bar 19.

The inner ends of the bars 55 are each provided with pins 60, each of the pins 60 being slidably mounted in looped members 51 secured to the outer edges of the members 49. The outer ends of the members 55 near the pivoted portion are also provided with pins 60ª designed to be slidably mounted in looped members 61ª similar to said members 60 and 61. These members 61ª are secured to the inner edges of the members 19.

Secured to the central portion of the right hand member 54, I have provided a pivoted link 62, one end of which is pivoted to a bell crank lever 63. This lever 63 serves as a handle by which the stanchion members 49 may be opened and closed. This is accomplished by throwing the upwardly projecting end of the handle 63 either to the right or left, as shown in Figure 4. After the said handle is moved toward the left, the right hand bar 54 will be moved downwardly which will throw the left hand member 54 upwardly through the curved member 52. This will cause the members 55 to be oscillated on the pivots of the members 56 in such a manner that the bars 49 will be moved toward the members 19 and parallel to each other. A reverse movement of the lever 63 will close the stanchion members 49.

By this arrangement of the links 55 and the loop members 61, I have provided means whereby the bars 49 may be moved to a considerable distance by comparatively short movement of the lever 63, and so arranged that when the links 55 are in the horizontal position as shown in Figure 4, the bars 49 will substantially be locked against being moved outwardly by an animal locked between the bars, due to the links 55 being substantially in a horizontal position when the bars 49 are closed.

Secured to each of the boards 33 and 36, I have provided a brace 64 which extends downwardly and toward the right, shown best in Figure 6, and engages the member 15 and is secured thereto. Extending laterally from the central portion of the brace 64 is another brace 65 which is also secured to the flange of the member 15. Rotatively mounted near the central portion of the brace 64, I have provided a shaft 66 which extends parallel with the members 10. The rear end of the shaft 66 is provided with a lever 67 which is designed to coact with the sector 68, best shown in Figure 3.

Secured near each end of the shaft 66, I have provided an eccentrically arranged cam 69 pivotally secured to said shaft. Pivotally secured in each of the boards 33 and near the braces 64, I have provided a plate 70. This plate is pivotally mounted by means of hinges 71. Adjustably secured to the upper edge of the plate 70 by means of thumb screws 71ª, I have provided a plate 71ᵇ, the said plate being provided with suitable slots whereby it may be adjustably mounted relative to the plate 70. The upper end of the plate 71ᵇ is provided with a curved portion 72, the width of the plates when extended being substantially equal to the length of the stanchion members 49. The curved portion 72 is provided with spring acuated hooks 73. These plates serve as a platform or table when the mechanism is in the position shown in Figure 3, the said plates being designed to rest on the cams 69 when in a horizontal position. The free ends of the plates may be adjusted by operating the lever 67, thereby rotating the shaft 66 and with it the cam 69.

Secured to the opposite side of the front board 33, I have provided a plate 74 which is designed to carry a ball on the upper end of the pin 75, as shown in dotted lines. The ball is designed to carry socket plates 76 which are held together by means of a bolt 77. These plates 76 are designed to carry a shaft 78, one end of which extends upwardly and substantially parallel with the stanchions. The other portion of the member 78 extends horizontally and parallel with the members 10 and is provided with upturned portions 79 on its rear end, thus forming a substantially U-shaped shaft universally pivoted on the plate 74. The upper end of the shaft 78 extends through a slotted plate 80 which is secured to the top edges of the members 20.

Pivotally mounted on the top of said plate 80 and adjacent to the forward edge of the slot therein, I have provided a tooth bar 81 having teeth 82 designed to engage the shaft 78 so as to lock it in any of its positions of movement in said slot. A spring 83 is provided for yieldingly holding the bar in its locked position.

Secured to the members 78 and 79, I have provided a plate 84, said plate being secured in position by means of straps 85 which are slidably mounted on the said shaft, two of the said straps 85 being provided with thumb screws 86 so that the said plate may be locked in any of its positions of movement along the said shaft.

Mounted on the upper end of the shaft 79 and near the upper portion of the shaft 78, I have provided a plate 87 adjustably secured in position by straps 88 having thumb screws 88ª. The plate 84 is so arranged that it will slide over the plate 87 for the purpose hereinafter made clear.

The top edge of the plate 87, as shown in Figure 1, is provided with a curved portion 89 similar to the curved portion 72 of the plate 70, and provided with catch members 90 to coact with the hooks 73. When the edges of the curved portions 72 and 89 are locked together as shown in Figure 6, the plates 87 and 70 form a substantially U-shaped trough.

By rotatively mounting the shaft 78 in the plate 80 and on the bottom of the plate 74, it will be seen that the plates 84 and 87 may be rotated in a vertical plane and about a horizontal axis, as shown in Figure 2. To lock the said plates 84 and 87 parallel to the plate 70, I have provided a spring hook device 91, shown in Figures 1, 2 and 3, mounted on the rear board 33, which will engage the rear end of the horizontal portion of the shaft 78.

By the construction just described, it will be seen that I have provided a support comprising the runners 10, cross members 11, brackets 13, rollers 14 which are designed to carry the stanchion and containing members which are rotatively mounted thereon by means of the circular members 15 and the rack 40, which is operated by means of the pinions 43 on the shaft 42.

The practical operation of the catching and operating mechanism as used for such animals as hogs is as follows:

Assuming that it is desired to operate on a hog, the rotatively mounted member is rotated to the position shown in Figure 4 with the floor member 38 at its lowest point of movement and substantially horizontal. This leaves the members 49 in a vertical position, as shown in Figure 4. The upper end of the shaft 78 is grasped and the said shaft moved inwardly until it stands in a substantially vertical position. The handle 67 may then be operated and the cams 69 moved to position so that the plate 70 lies substantially parallel with the bars 64. The plate 84 is moved to its extreme lower position of movement, as shown in Figure 1.

The plates 87 and 71$^b$ may be adjusted to accommodate hogs of different sizes. For smaller hogs the said plates would be adjusted closer to the platform, or for the larger hogs they would be moved farther away.

The lever 63 is then grasped and moved to the left as shown in Figure 4, which will cause the members 49 to be separated any distance desired by the operator. The animal is then driven into the space between the plates 70 and 87 from the rear end. It is driven forward until it thrusts its head between the members 49, at which time the handle 63 is moved to the right which causes the said stanchion members to be closed and the animal locked in position.

If the operation is to be a vaccination, the upper edges of the plates 70 and 87 are moved toward each other and locked in position by means of the hooks 73. The crank 49 is then grasped and rotated which will cause the apparatus to be revolved until the said plates are in an inverted position, which throws the animal on its back, being held against movement by the side plates 70 and 87.

In operations of this kind it is sometimes desirable to operate along the side and the abdominal regions. In this case the set screws 86 are loosened and the plate 84 moved over the plate 87 to the lower limit of movement when the device is in an inverted position. The lower board 38 may also be moved by releasing the buttons 39. After the operation has been performed, the plate 84 may be again adjusted to its original position and the floor board 38 placed in its original position. The device may then be moved to its upright position by operating the said handle 49$^a$.

If it is desired to operate on the animal's back or its hind quarters, the device is moved to the position shown in Figure 3. This will throw the animal on its side on the plate 70; the said plate may be given any desired elevation by operating the handle 67. When the device is in this position, it is often desirable to move the plates 84 and 87 to such a position that they will be out of the way. This is accomplished by releasing the latch 91 which will then permit the shaft 87 to be swung so that the plates carried thereby may be moved to substantially a vertical position, and the device is in the position shown in Figure 2. This gives the veterinarian free access to that portion of the animal upon which he desires to operate.

In order to obtain further access, it is sometimes desirable to remove the member 23. This may be done before the animal is placed in the stanchion if so desired, and is accomplished by moving the bolt 31 of the member 29. When the mechanism is rotated to the position shown in Figure 3, all of the rack bar 40 is not necessary and would sometimes be in the way, so I have constructed the said bar in two pieces, the detachable portion being indicated by the numeral 40$^a$. The free end of this piece 40$^a$ is secured to the bar 29, while the opposite end is hooked to the end of the bar 40 by hook device 40$^b$, the member 23 being provided to form a continuation of the member 15 when the device is in its inverted position, the bar 40$^a$ also being provided when the device is in the said inverted position. The member 23 and the piece 40$^a$ may be secured to each other by means of the member 29 and a brace 29$^a$, shown in Figure 1, so that both of the said members may be removed as a unit.

Thus it will be seen that I have provided a mechanism whereby animals may be easily caught and held and placed to any desired position most convenient for the operation which is to be performed.

By building the device somewhat larger and stronger it may also be adapted to operate on larger animals such as cattle and horses, and it is my intention to also adapt the device for the purpose of dehorning cattle for which the device may be easily and quickly adapted by adding the following mechanism:

Each of the members 49 is provided with a plate 92 which is secured in position by any convenient means such as rivets or screws. These plates 92 are illustrated in position in Figures 5 and 6 of the drawings. One of the members 19 has its front face provided with hinged members 93, while the other member 19 is provided with an eye bolt 94. The hinged members 93 are designed to carry a frame 95 which is formed preferably of wood and has its free end provided with an eye bolt 96, having its opening so arranged as to aline with the opening of the bolt 94. The said openings are designed to receive a pin 97 by which the frame is locked in position.

The top edge of the frame 95 is provided with a notch 98, and is designed to carry a rotatively mounted shaft or windlass 99, one end of which is provided with a crank 100. A ratchet 101 is also mounted on the said shaft 99 and designed to coact with a pawl 102.

When it is desired to dehorn an animal, the animal is driven on the platform 40 between the side plates which are moved to an opened position. When the animal has placed its head in the stanchion, they may be closed as before described after which the frame 95 is swung in position beneath the animal's neck which rests in the notch 98. The pin 97 is then inserted.

For securing the head in position in the said notch, I have provided ropes 103, each of which has one end secured to the frame 95 on opposite sides of the notch 98. The ropes are then thrown across the top of the animal's neck back of its ears in opposite directions, the free end of one of said ropes being provided with a pad 104 which is slidably mounted thereon. The opposite end of the pad is provided with a hook 104ª. The said pad is then placed across the nose as illustrated in Figure 7, and the rope 103 placed in the hook 104ª. The free ends of the ropes are then secured to the shaft 99 in any convenient manner. The crank 100 is then operated which will cause the ropes to be drawn tight and also the pad 104. This holds the animal's head so he cannot move it while the horns are being removed.

I have found by actual experience that when animals are thus secured in position and are being dehorned, they have a tendency to want to sit down on their hind quarters and throw their hind feet between the stanchion members 49 and the upright members 19. For this reason I have provided the plates 92. In this connection, it may be noted that the side plates may be moved until they engage the animal's sides, if so desired.

Thus it will be seen that I have provided a mechanism which is particularly adapted for the purpose of quickly and easily catching and holding animals and placing them into position for various operations. The device may be easily and quickly moved from one position to another by hitching a team to a clevis 105.

I claim as my invention:

1. In a device of the class described, a support, a frame rotatively mounted thereon, means for rotating said frame, a side plate pivotally mounted near the bottom of said frame, the free end of said side plate being curved inwardly, a second side plate pivotally mounted at the opposite side of said frame having its free end curved inwardly, means for independently adjusting said side plates to or from each other, and means for locking the curved edges of said side plates adjacent to each other.

2. In a device of the class described, a support, a frame rotatively mounted thereon, means for rotating said frame, a floor member on said frame, a side plate having one edge pivotally mounted adjacent to one edge of said floor member, the free edge of said plate being curved inwardly, a second plate having one edge pivotally mounted adjacent to the opposite side of said floor member and having its free edge curved inwardly, said plates being spaced apart at their pivoted edges, and when in a closed position having their curved edges adjacent to each other to form a comparatively closed passageway open at each end.

3. In a device of the class described, a support, a frame rotatively mounted thereon, means for rotating said frame, a detachable floor member, a stanchion device, means for actuating said stanchion, a side plate pivoted adjacent to said floor member, means for moving the free end of said side plate laterally and locking it in said position of movement, a second side plate parallel to the first said side plate, means for pivotally mounting said second plate about an axis perpendicular to the axis of the first said plate, means for locking the said second plate in position parallel to the first said plate.

4. In a device of the class described, a support, a frame rotatively mounted thereon, means for rotating said frame, a platform on said frame, a stanchion device in said frame, a side plate pivotally mounted adjacent to said floor member, the free end of said side plate being curved inwardly, a second side plate pivotally mounted adjacent to the opposite side of said floor member having its free end curved inwardly, means for independently adjusting said side plates to or from each other, and means for locking the curved edges of said side plates adjacent to each other.

5. In a device of the class described, a support, a frame rotatively mounted on said support, means for rotating said frame, a floor in said frame, a stanchion device in said frame, means for operating said stanchion, a side plate having one edge pivotally mounted adjacent to said floor member, means for moving the free end of said plate laterally, means for locking the last said means, a U-shaped shaft having one of its corners universally pivoted, means slidably mounting one end of said shaft, means for locking the said slidably mounted end in various positions of its movement, a spring latch device for the opposite corner of said U-shaped shaft, a plate member fixed to the parallel members of said shaft, a plate slidably mounted to the last said plate and means for locking said slidably mounted plate in any of its positions of movement, the plates on said U-shaped shaft being designed to rest substantially parallel with the said pivoted plate when in their locked positions.

6. In a device of the class described, a support, a frame rotatively mounted on said support, means for rotating said frame, a floor in said frame, a stanchion device in said frame, means for operating said stanchion, a plate having one edge pivotally mounted adjacent to one edge of said floor member and having its free end curved inwardly, a shaft rotatively mounted in said frame adjacent to the outer face of said plate, eccentric cams on said shaft designed to rest against said plate, means for rotating said shaft, an adjustable plate parallel with the first said plate having one edge pivotally mounted adjacent to the opposite edge of said floor member and its free end curved inwardly, means for locking the edges of said curved portions together, and means for locking the last said plate in various open positions of its movement.

7. In a device of the class described, a support, a frame rotatively mounted on said support, means for rotating said frame, a floor in said frame, a stanchion device in said frame, means for operating said stanchion, a plate having one edge pivotally mounted adjacent to one edge of said floor member and having its free end curved inwardly, a shaft rotatively mounted in said frame adjacent to the outer face of said plate, eccentric cams on said shaft designed to rest against said plate, means for rotating said shaft, an adjustable plate parallel with the first said plate having its free edge curved inwardly, means for pivotally mounting said adjustable plate on a pivot parallel with the pivot of the first said plate or upon a pivot at right angles to the pivot of the first said plate, and means for locking the curved edges of said plates together.

8. In a device of the class described, a support, a frame rotatively mounted thereon, means for rotating said frame, a floor member on said frame, a side plate having one edge pivotally mounted adjacent to one edge of said floor member, the free edge of said plate being curved inwardly, a second plate having one edge pivotally mounted adjacent to the opposite side of said floor member and having its free edge curved inwardly, means for locking the said curved edges together, means for independently adjusting said side plates to or from each other, said plates being spaced apart at their pivoted edges, and when in a closed position having their curved edges adjacent to each other to form a comparatively closed passageway open at each end, and a stanchion device adjacent to one end of said plates, said stanchion device being provided with transversely movable members capable of moving toward or from each other, each of these movable members being provided with a plate so arranged that when the members are adjacent to each other the opening at one end of said passageway will be closed.

9. In a device of the class described, a support, a frame rotatively mounted thereon, means for rotating said frame, a detachable floor member in said frame, spaced parallel and hinged side members, means for locking said side members in various positions of their movements, a stanchion device in said frame having movable members, means for simultaneously moving said members to or from each other, means for locking the said members in their closed position, an auxiliary frame pivoted to said frame designed to rest transversely with said stanchion members and substantially midway between their ends, a notch in one end of said frame designed to receive an animal's neck, a windlass in said pivoted frame, a looped rope having each of its ends secured to said windlass, and a pad slidably mounted on the members of said loop, means for rotating said windlass and means for locking said windlass against rotation in one direction.

10. In a device of the class described, a support, a frame rotatively mounted on said support, means for rotating said frame, a floor member, parallel pivoted side members, means for moving said pivoted side members to or from each other, a stanchion device in said frame adjacent to one end of said side members having parallel members movable to or from each other, a plate secured to the back face of each of said movable members, means for simultaneously moving said members, an auxiliary frame pivotally mounted in front of said movable members to swing about an axis parallel to said members and at a point substantially midway between their ends, means for locking the free end of said auxiliary frame, a windlass in said auxiliary frame, a looped rope having each end secured to said windlass, a pad slidably mounted on said looped portion.

11. In a device of the class described, a support, a floor in said support, parallel side members, the lower edge of each of said members being pivotally mounted parallel and adjacent to said floor, means for moving said side members to or from each other, a stanchion adjacent to the forward end of said side members having parallel and movable members, a plate secured to the back face of each of said movable members, means for simultaneously moving said members, an auxiliary frame pivotally mounted in front of said movable members to swing about an axis parallel to the said members and at a point substantially midway between their ends, means for locking the free end of said auxiliary frame, a windlass in said auxiliary frame, a looped rope having each end secured to said windlass, a pad slidably mounted on said looped portion.

12. In a device of the class described, a support, spaced parallel side members, a stanchion adjacent to the forward end of said side members having parallel and movable members, means for simultaneously moving said members, an auxiliary frame pivotally mounted in front of said movable members to swing about an axis parallel to said members and at a point substantially midway between their ends, means for locking the free end of said auxiliary frame, a windlass in said auxiliary frame, a looped rope having each end secured to said windlass, for the purposes stated.

Des Moines, Iowa, April 19, 1921.

JOHN E. RYAN.